(12) United States Patent
Sandelius

(10) Patent No.: US 9,112,337 B2
(45) Date of Patent: Aug. 18, 2015

(54) TOOL AND METHOD FOR TRANSFER OF TUBES

(76) Inventor: Nils Sandelius, Amal (SE)

(*) Notice: Subject to any disclaimer, the term of this patent is extended or adjusted under 35 U.S.C. 154(b) by 904 days.

(21) Appl. No.: 13/140,854

(22) PCT Filed: Dec. 22, 2009

(86) PCT No.: PCT/SE2009/051486
§ 371 (c)(1),
(2), (4) Date: Jul. 7, 2011

(87) PCT Pub. No.: WO2010/074642
PCT Pub. Date: Jul. 1, 2010

(65) Prior Publication Data
US 2012/0034042 A1 Feb. 9, 2012

(30) Foreign Application Priority Data

Dec. 22, 2008 (SE) .................................. 0802655

(51) Int. Cl.
*H02G 1/00* (2006.01)
*B23B 51/08* (2006.01)
*H02G 3/22* (2006.01)

(52) U.S. Cl.
CPC *H02G 1/00* (2013.01); *B23B 51/08* (2013.01); *H02G 3/22* (2013.01); *Y10T 408/04* (2015.01); *Y10T 408/89* (2015.01)

(58) Field of Classification Search
CPC ......... H02G 1/08; H02G 1/081; H02G 1/085; B23B 51/08
USPC .................... 254/134.3 FT, 134.3 R, 134.4
See application file for complete search history.

(56) References Cited

U.S. PATENT DOCUMENTS

| | | | | |
|---|---|---|---|---|
| 3,697,188 A | * | 10/1972 | Pope | 408/230 |
| 4,076,444 A | | 2/1978 | Siebrecht | |
| 5,067,843 A | * | 11/1991 | Nova | 403/301 |
| 5,149,231 A | * | 9/1992 | Bowling | 408/82 |
| 5,310,294 A | * | 5/1994 | Perkins | 408/226 |
| 5,395,188 A | * | 3/1995 | Bailey et al. | 408/127 |
| 5,529,443 A | * | 6/1996 | Flener | 408/226 |

(Continued)

FOREIGN PATENT DOCUMENTS

FR          2666040 A1      2/1992

OTHER PUBLICATIONS

International Search Report and Written Opinion (mailed Apr. 12, 2010).

(Continued)

*Primary Examiner* — Lee D Wilson
*Assistant Examiner* — Tyrone V Hall, Jr.
(74) *Attorney, Agent, or Firm* — Jeffrey S. Melcher; Manelli Selter PLLC

(57) ABSTRACT

The present invention relates to lead-through tool for pipes, comprising a tool body (1) having a rear end (15) provided with a means (16) for interaction with a rotary machine, preferably a handheld drilling machine, and a front end (17) at which there is provided either an adapter mechanism (18) for coupling to a removable implement (2) or an implement (19) integrated with said end (17), preferably in the form of a drill steel, wherein said tool body (1) is provided with holding means (13), at a position between said front (17) and rear (15) end, said holding means (13) being adapted to be able to hold a pipe (3) which is slipped onto said tool body (1) over said rear end (15) until interacting with said holding means (13).

11 Claims, 1 Drawing Sheet

(56) References Cited

U.S. PATENT DOCUMENTS

| | | | | |
|---|---|---|---|---|
| D403,932 S | * | 1/1999 | Klamm | D8/14 |
| 5,888,035 A | * | 3/1999 | Cutler | 408/225 |
| 6,257,808 B1 | * | 7/2001 | Groot | 408/1 R |
| 6,318,704 B1 | * | 11/2001 | Christenson | 254/134.3 R |
| 7,131,790 B1 | * | 11/2006 | Cordoves | 405/184 |
| 7,216,846 B2 | * | 5/2007 | Crawford | 254/134.3 FT |
| 7,354,228 B2 | * | 4/2008 | Lambert | 408/226 |
| 2004/0013483 A1 | * | 1/2004 | Thomsen | 408/226 |
| 2007/0201963 A1 | * | 8/2007 | Lambert | 408/226 |

OTHER PUBLICATIONS

European Search Report issued in European application No. 09835353.5 on Nov. 13, 2013.
European Search Report issued in European application No. 09835353.5 on Jun. 3, 2014.
European Communication pursuant to Article 94(3) issued in European application No. 09835353.5 on May 5, 2015.

* cited by examiner

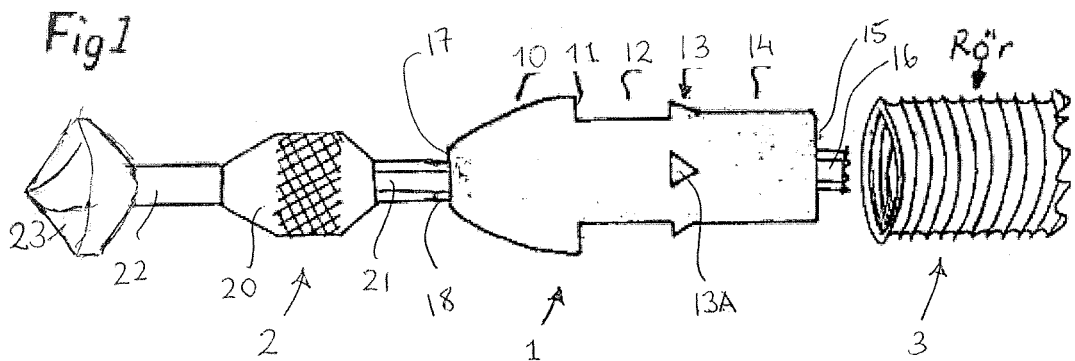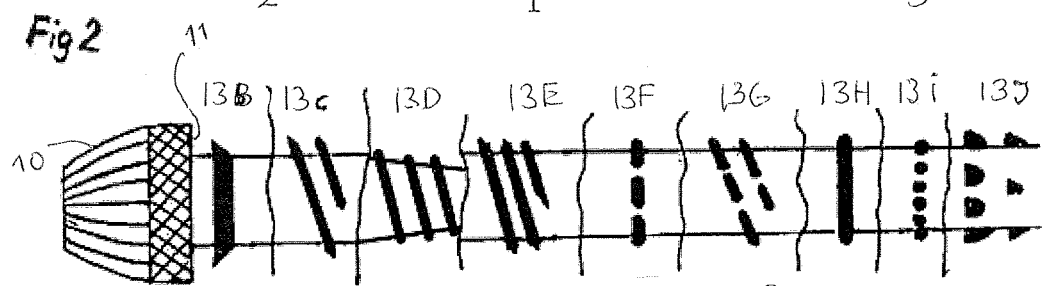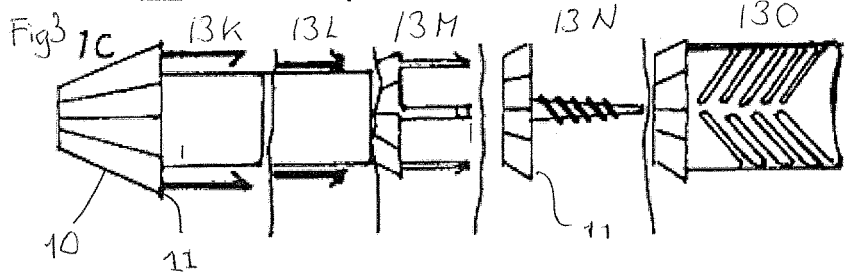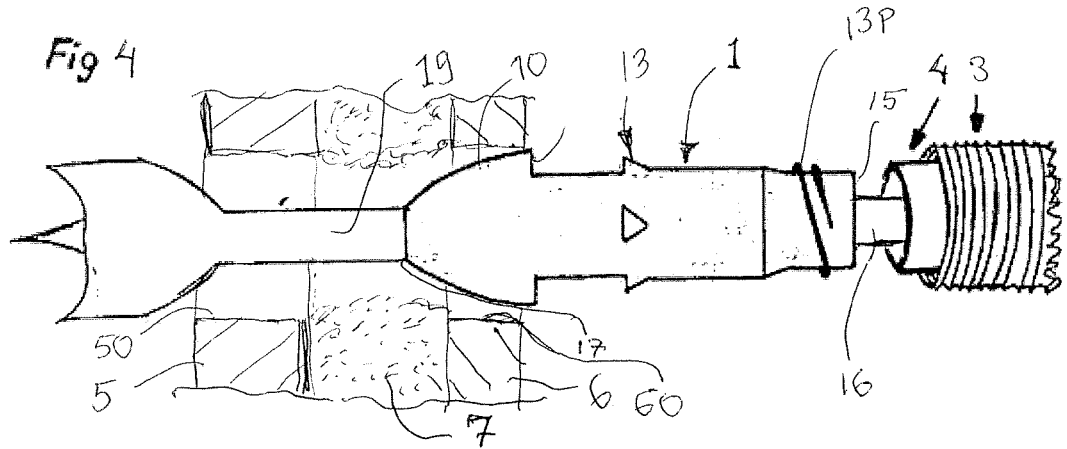

TOOL AND METHOD FOR TRANSFER OF TUBES

CROSS-REFERENCE TO RELATED APPLICATIONS

This application is a national stage entry under 35 U.S.C. 371 of International Application No. PCT/SE2009/051486, filed 22 Dec. 2009, designating the United States. This application claims foreign priority under 35 U.S.C. 119 and 365 to Swedish Patent Application No. 0802655-1, filed 22 Dec. 2008. The complete contents of these applications are incorporated herein by reference.

TECHNICAL FIELD

The present invention relates to a method and a tool for lead-through of pipes, comprising a tool body having a rear end provided with a means for interaction with a rotary machine, preferably a handheld drilling machine, and a front end at which there is provided either an adapter mechanism for coupling to a removable implement or an implement integrated with said end, preferably in the form of a drill steel.

BACKGROUND

Electricians, plumbers, and others often get problems after making holes in a wall/floor etc., with being able to pass a cable after a pipe through the drilled hole. One frequently occurring reason for this is that walls, floors, as a rule contain e.g. insulation chips, plastic, tar paper or other similar things preventing an easy lead-through. Another reason might be that the hole is drilled through two walls arranged at a distance from each other and that the cavity between these walls is large. The problem implies that waste of time frequently occurs when pipes or cables are to be passed through walls or the like.

BRIEF SUMMARY OF THE INVENTION

It is an object of the invention to eliminate or at least minimize the above-mentioned problem, which is achieved by means of a lead-through tool for pipes, comprising a tool body having a rear end provided with a means for interaction with a rotary machine, preferably a handheld drilling machine, and a front end at which there is provided either an adapter mechanism for coupling to a removable implement or an implement integrated with said end, preferably in the form of a drill steel, wherein said tool body is provided with holding means, at a position between said front and rear end, said holding means being adapted to be able to hold a pipe which is slipped onto said tool body over said rear end until interacting with said holding means.

Thanks to the invention, the lead-through of required pipes and/or conduits can be achieved in a simple and time effective manner in connection with the making of holes.

Advantageous aspects according the invention are evident from the attached dependent claims, and also from the following description.

GENERAL DESCRIPTION OF THE FIGURES

In the following, the invention will be described in greater detail with reference to the attached figures, in which:

FIG. 1 shows a side view of a first embodiment of a tool according to the invention;

FIG. 2 shows a second embodiment with different alternative fixing means;

FIG. 3 shows a third embodiment with further alternative fixing means;

FIG. 4 shows a side view of a fourth embodiment of a tool body according to the invention, as seen from the side through a penetrated wall section.

DETAILED DESCRIPTION

The basic principle of the invention (which is most clearly evident from FIG. 4) is that a pipe 3 (or two pipes 3, 4) is fixed to the lead-through tool 1 according to the invention, while a drill steel 19 being integrated with the front portion 17 of the tool body 1 is still inside a hole 50, 60, which has been formed by the drill steel 19. In this case a hole 50, 60 through a wall 5, 6, 7, consisting of two walls 6, 7 arranged spaced apart with an insulating material 7 in between them. A rear pipe 4 is first brought to attachment (by thread attachment) around a rear fixing device 13p, which is arranged at a rear cylindrical portion having a relatively small diameter. Then, an outer pipe 3 is fixed around the main fixing means 13, which is arranged at an intermediate cylindrical portion having a larger diameter than the rear portion. Thereupon, the pipes 3, 4 can easily be passed through the holes 60, 50 in the wall, by pulling at the drill steel 19, at the portion penetrating out from the holes 50, 60. Alternatively, the pipe/pipes 3,4 is/are fixed to the tool 1 before it is brought through the finished hole/holes 50, 60.

FIG. 1 shows that the body 1 is substantially cylindrical. In a direction rearward from its front end 17 it is provided with a curved conical (ball-shaped) portion 10, to then exhibit an abruptly reduced diameter in the form of a shoulder 11. The shoulder 11 contributes the advantage of being able to serve as a stop for the pipe 3 and the conical front portion 10, with the advantage that a simple penetration is achieved. A cylindrical portion 12 follows when continuing in the rearward direction of the tool body 1. Thereupon, there follows one/a number of holding means 13a in the form of a kind of barbs, which suitably exhibit end surfaces oppositely directed to the first shoulder 11. The holding means 13 has a smaller cross-sectional dimension than the first shoulder 11, but a larger maximum cross-sectional dimension than the diameter of the intermediate portion 12. In connection with the holding means 13 and in a direction toward the rear end 15, there is an additional cylindrical portion 14, extending all the way to the rear end 15, where a rod-shaped means 16 is arranged in a centered way for interaction with a suitable machine, for example a handheld drilling machine/screw driver (not shown).

At the front end 17 of the tool 1, there is arranged an adapter device, preferably in the form of a recess having a non-round cross-sectional shape (e.g. hexagonal) for rotationally fixed attachment of a suitable work implement 2, which in a known way is provided with a correspondingly designed rod-shaped body 21, and at the front end 22 of which the required implement, e.g. a drill steel 22, 23, is arranged. In such an embodiment, there is advantageously used some kind of locking means in interaction between the rod 21 and the hole 18, so that the implement 2 can be subjected to a pulling force while it is ensured that the tool body 1 is brought along. Alternatively, the tool body 1 can either itself, or by means of an integrated implement 19, be made sufficiently long in order to reach through most holes.

FIGS. 2 and 3 show some of several conceivable, functional variants of what is shown in FIG. 1. In FIG. 2, the front portion 10 is bevelled and terminated by a knurled portion which simplifies the assembly process if the "threading principle" is used for fixing into the pipe 3. FIG. 3, instead, shows that the front portion also can be made "linearly conical".

Furthermore, in FIG. 3, several different embodiments of the fixing means 13 are shown, wherein, briefly:

13B indicates a "shoulder" which completely encloses part of the cylinder portion 12;

13C indicates one or several threads which enclose part of the cylinder portion 12;

13D indicates a tapered thread;

13E indicates a cylindrical thread;

13F indicates a number of oblong "bosses";

13G indicates a number of oblong "bosses", which are applied as a thread;

13H indicates a symmetrical collar;

13I indicates a number of round "bosses";

13J indicates a number of "bosses", which are "straight cut", oppositely directed to the shoulder 11, with a first row, having a relatively large radial cross-sectional dimension, and a second row, axially displaced away from the shoulder (with respect to the first row), said second row having a smaller radial cross-section than the first row, wherein both rows are arranged at a cylindrical portion having the same diameter.

In a corresponding way, an additional number of modifications which are possible for providing a holding means 13 are evident from FIG. 3, wherein:

13K indicates a number of "resilient hooks", with the "barbs" oppositely directed to the shoulder 11 and angled inward toward the body 1;

13L indicates a number of "resilient hooks", where the "barbs" are oppositely directed to the shoulder 11 but angled outward from the body 1;

13M indicates a further variant having a number of resilient hooks with barbs.

FIGS. 13N and 13O are two of several conceivable modifications for fixing e.g. cables for lead-through, if there is no need for any protecting cover for the cable/cables in the cavity, wherein:

FIG. 13N indicates a "wood-screw shaped" portion fitted in the area of the shoulder 11;

FIG. 13O indicates resilient locking legs, projecting inward and obliquely rearward.

FIG. 4 shows a drill steel 19, which is integrated with the body 1. In this embodiment, the holding means 13 is a combination of 13A and 13C, which is a solution suited for e.g. plumbers, who sometimes want to "insert one pipe into another" through walls/floors etc., wherein the outer pipe 3 then serves as a "signal pipe" if the liquid-carrying "inner hose" 4 should start to leak.

The invention is not limited by what has been described hereinabove, but can be varied within the scope of the following claims. For instance, it is appreciated that many different combinations of embodiments of the holding means 13 can be used, for example, in order to obtain a more reliable fixing of the pipe, wherein two or several holding means thus can be arranged in connection with each other axially. Furthermore, it is appreciated that the implement 2, 19 which is used in the invention can be varied broadly for adaptation to different kinds of needs/situations.

The invention claimed is:

1. A lead-through tool for tubes, conduits, cables, hoses, and pipes comprising:

a tool body having a rear end provided with a rod-shaped means for interaction with a rotary machine, and a front end at which there is provided either an adapter mechanism for coupling to a removable implement or an implement integrated with the end, wherein said tool body is provided with a first holding means, at a position between the front and rear ends, said holding means being adapted to be able to hold a pipe, a tube, a conduit, a cable, or a hose which is slipped onto the tool body over the rear end, until interacting with the holding means, wherein that either the tool body, the removable implement locked to said adapter mechanism, or the integrated implement, is arranged to be subjected to a pulling force to enable easy passage of the tube, the conduit, the cable, the hose, or the pipe through a hole, and wherein an additional holding means is arranged at the tool body, between the first holding means and the rear end, wherein the additional holding means exhibits a smaller maximum cross-sectional extension than the first holding means.

2. The lead-through tool for tubes, conduits, cables, hoses, and pipes according to claim 1, wherein the tool body, in connection with the front end, exhibits a front portion having a gradually increasing diameter in a direction rearward, that the maximum diameter of the front portion exceeds the maximum cross-sectional dimension of the holding means, and that there is an axial gap between the position of the maximum diameter and the position of the holding means.

3. The lead-through tool for tubes, conduits, cables, hoses, and pipes according to claim 2, wherein a shoulder is provided, creating a transition from the maximum diameter to an intermediate portion having a smaller diameter, and that said intermediate portion extends to the holding means, and that the intermediate portion, in connection with the holding means, exhibits a smaller diameter than the maximum cross-sectional dimension of the holding means.

4. The lead-through tool for tubes, conduits, cables, hoses, and pipes according to claim 1, wherein the holding means is arranged at an axial distance from the rear end.

5. A method for lead-through of tubes, conduits, cables, hoses, and pipes through walls comprising:

using a tool body for passing a tube, a cable, a hose, a pipe, or a conduit, through a hole disposed in a wall or the like, wherein the tool body, at a rear end, is provided with a means for interaction with a rotary machine, and that at a front end is provided with either an adapter mechanism for coupling to a removable implement or an implement integrated with the front end and the tool body is provided with a first holding means, at a position between the front end and rear end, and an additional holding means positioned between the first holding means and the rear end, wherein the additional holding means exhibits a smaller maximum cross-sectional extension than the first holding means;

slipping a pipe, a tube, a cable, a hose, or a conduit onto the tool body over the rear end until interacting with the additional holding means and the first holding means respectively; and displacing said tool body, together with the pipe, the tube, the cable, the hose, or the conduit through the hole by applying a pulling a force to either the tool body, the removable implement locked to the adapter mechanism, or the integrated implement.

6. The method according to claim 5, wherein the tube, the conduit, the cable, the hose, or the pipe is clamped to the holding means.

7. The method according to claim 5, wherein the tube, the conduit, the cable, the hose, or the pipe is attached by being threaded to holding means.

8. The lead-through tool for tubes, conduits, cables, hoses, and pipes according to claim 1, wherein the rotary machine is a handheld drilling machine.

9. The lead-through tool for tubes, conduits, cables, hoses, and pipes according to claim 1, wherein the implement integrated with the end is in the form of a drill steel.

10. The method according to claim 5, wherein the rotary machine is a handheld machine.

11. A method for lead-through of tubes, conduits, cables, hoses, and pipes through walls comprising:
- cutting a hole in a wall using a tool body connected to a rotary machine, wherein the tool body, at a rear end, is provided with a means for interaction with the rotary machine, and that at a front end is provided with either an adapter mechanism for coupling to a removable implement or an implement integrated with the front end, and the tool body is provided with a first holding means, at a position between the front end and rear end, and an additional holding means positioned between the first holding means and the rear end, wherein said additional holding means exhibits a smaller maximum cross-sectional extension than the first holding means;
- removing the rotary machine from the tool body;
- slipping a pipe, a tube, a cable, a hose, or a conduit onto the tool body over the rear end until interacting with the additional holding means and the first holding means respectively; and
- pulling on the front end of the tool body, the removable cutting implement locked to the adapter mechanism, or the integrated cutting implement to pull the tool body with the pipe, the tube, the cable, the hose, or the conduit through the hole.

* * * * *